United States Patent Office 2,802,718
Patented Aug. 13, 1957

2,802,718

CATALYTIC TREATMENT OF ORES

George A. Zotos, New York, N. Y.

No Drawing. Application March 18, 1955,
Serial No. 495,349

8 Claims. (Cl. 23—18)

My invention relates to a new and improved wet catalytic method of making the salts of selected metals, said salts of said selected metals being soluble and stable in aqueous alkaline solution, said salts having the selected metals in their anions.

As one example, and without limitation thereto, the selected metal may be tungsten, and the salt may be sodium tungstate $Na_2WO_4$.

The structural formula of sodium tungstate salt is,

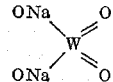

Its cation is ($ONa.ONa+$). Its anion is ($WO_2-$).

This salt is soluble in aqueous alkaline solution, as in an aqueous solution of sodium hydroxide. This salt is also stable in aqueous alkaline solution, whereas the water-soluble salts of other metals, such as ferrous sulfate, react in aqueous solution with a dissolved alkaline hydroxide to precipitate ferrous hydroxide, $Fe(OH)_2$.

As one example of a prior and well-known process, tungsten ores, such as ferberite ($FeO.WO_3$), have been extracted with aqueous solutions of sodium hydroxide, potassium hydroxide and other extracting agents, to form the water-soluble and stable or non-precipitated tungstate, and also to form a water-insoluble or precipitated iron compound, thus separating the tungsten from the iron. In this example, the iron is an example of a class of metals which are designated, for convenience, as non-selected metals. In such prior wet processes, the process depended wholly upon the activity of the cation of the extracting agent such as ($K+$) or ($Na+$).

According to this invention, and as a wholly novel and pioneer step, I include, in the aqueous solution of the alkaline or basic extracting agent, a catalyst which has an active anion. This anion is a substituted carboxylic group, in which the hydrogen atom of the carboxylic group (COOH), has been substituted by a metallic ion. Without limitation thereto, the substituted metallic ion may be sodium or potassium, so that the anion may be (COOK—) or (COONa—). The catalyst may have one or more said anions. Depending upon the conditions of the process, the carboxylic hydrogen atom may be replaced by a basic radical, if the resultant anion group remains stable under the required conditions of temperature and pressure.

The highly preferred catalysts, which are in a very active and selective group, are the formates, such as sodium formate, potassium formate, magnesium formate, and formates of other metals of the alkali group or group I of the periodic system, which include lithium, rubidium and caesium. The alkali group also includes the basic ammonium radical ($NH_4$), and ammonium formate can be used, if it is stable under the conditions of the process. This applies to other basic radicals which can be used as substituents for the carboxylic hydrogen in the (COOH—) group.

Sodium formate (H.COONa) and potassium formate (H.COOK) are the highly preferred formate catalysts. The formates are highly dissociated in aqueous solution, and their anions are exceptionally active and critical for the desired purpose.

The highly preferred substituents for the carboxylic hydrogen are sodium and potassium.

I can also use water-soluble oxalates, as exemplified, without limitation thereto, by sodium oxalate

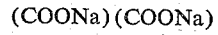

or sodium acid oxalate (COOH)(COONa) or the equivalent potassium salts.

I can also use water-soluble acetates, such as sodium acetate, $CH_3.COONa$.

I can also use propionates, such as potassium propionate, $CH_3.CH_2.COONa$. If the parent acid has a straight chain, as in propionic acid, $CH_3.CH_2.COOH$, said chain preferably and optionally has a maximum of three carbon atoms, as in propionic acid.

If copper formate, as one example, is dissolved in an aqueous solution of an extracting agent such as sodium hydroxide, the sodium atom displaces the copper atom in the copper formate, thus forming sodium formate in solution.

The effect is the same as though sodium formate has been dissolved in the solution. The important factor is the active (COOX—) anion, in which "X" represents the substituent for the carboxylic hydrogen in the original anionic carboxylic group (COOH—).

Considering ferberite as one example of the starting material, without limitation thereto, it is noted that iron can also form water-soluble salts in which the iron is in the anion, such as potassium ferrate, $K_2FeO_4$, whose structural formula is,

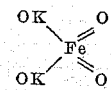

Its cation is ($OK.OK+$). Its anion is ($FeO_2-$).

Potassium ferrate and sodium ferrate are unstable.

It is noted that the (OK) part of the cation of potassium ferrate corresponds to the (OK) part of the anion (COOK—) of potassium formate. It is also noted that ferrous formate is a water-soluble salt, and that in general, all the formates are soluble in water.

Without limiting the invention to any theory, it is believed that the active anion group or groups, such as (COOK—), attack the chemical bond between the iron oxide and tungsten oxide in the ferberite, forming an unstable water-soluble complex between the anion group and the iron, and that the iron is immediately precipitated as ferrous hydroxide, $Fe(OH)_2$, if the solution contains an alkaline hydroxide.

The invention is especially useful in treating complex metal compounds, which are made up structurally of two or metal compounds or metal ions. This definition includes alloys. Ferberite and all other tungsten ores, and many other ores, are in the class of complex metal compounds or metal complexes. In many of these ores, there are two or more metal compounds, which are chemically bound to each other, as in tungsten ores.

It is well-known that many metals other than tungsten, form salts which are soluble in aqueous solution, and which are not precipitated by dissolved alkaline or basic agents in said aqueous solution, and in which the metal is in the anion of the salt.

Without limitation thereto, these other metals are exemplified by chromium, uranium, molybdenum, which respectively form water-soluble and stable chromates, uranates, molybdates, etc., which are not precipitated by alkalis.

It is also well-known that many metals other than iron form water-soluble salts which react in aqueous solution with a dissolved alkaline or basic agent to form an insoluble precipitate. These metals are designated as the non-selected metals when they are in the ore or alloy or other complex metal compound or metal complex. These other non-selected metals are exemplified by lead, copper, bismuth, and manganese. These non-selected metals form amphoteric hydroxides, which react in strong aqueous acid solution or strong, aqueous alkaline or basic solution, with the dissolved acid, or with the dissolved alkali or base.

Many of the tungsten ores, all of which can be used as starting materials, are described in "A Dictionary of Applied Chemistry" by Thorpe, vol. VII (published in 1927), pages 229–231 and page 489.

As examples of other ores which can be treated, without limitation thereto, I refer to chrome-iron ore, $FeO.Cr_2O_3$; the molybdenum ores or compounds which are described in vol. IV (published in 1922) of said "Dictionary of Applied Chemistry"; tellurium ores or compounds, described in vol. VI (published in 1926) of said "Dictionary of Applied Chemistry."

For convenience, as above noted, the active anion is designated as (COOX—), in which "X" is preferably a metal atom, but may be a basic radical, provided that the anion group is stable in the process, if "X" is a basic radical, such as $NH_4$.

The weight of the aqueous solution of the alkaline or basic extracting agent and the catalyst, may be equal to the weight of the ore or metal complex which is being treated. A greater weight of said solution is optional.

The activity of the catalyst is calculated upon the activity of sodium formate, as a convenient standard.

The weight of the dissolved sodium formate may be in a range of one percent to ten percent of the weight of the water of the solution. A higher concentration of the sodium formate is optional, but does not substantially increase the catalytic or accelerating effect. The preferred range is two percent to three percent of sodium formate, calculated on the weight of the water of the solution. The activity of any other catalyst which has said anion, is equal to the activity of an aqueous solution of sodium formate, in which the weight of the sodium formate is at least one percent of the weight of the water, preferably two percent to three percent.

Sodium formate is a strong reducing agent, but it does not act as a reducing agent in the reaction. It is not decomposed in the reaction.

In one test, tungsten trioxide, $WO_3$, was mixed with a two percent by weight aqueous solution of sodium formate, and the mixture was heated at 100° C. to 108° C. at substantially normal atmospheric pressure of 760 millimeters of mercury. There was no perceptible effect on the tungsten trioxide. This test shows that the sodium formate does not act to reduce tungsten trioxide. The sodium formate evidently acts as a catalyst, in combination with sodium hydroxide, potassium hydroxide, or other alkaline agent.

The invention is of great utility in treating ores which have large percentages of gangue impurities. These gangue impurities usually consist largely of silica.

Taking tungsten ores as an example, the general commercial method, which has been used since 1847, is to mix the dry ore with dry sodium carbonate and to heat the dry mixture in a furnace, with access of air, thus forming a fused reaction mass which includes sodium tungstate, and then dissolving the sodium tungstate in water from said mass. This method is prohibitively expensive if the ore has 85% or more by weight of gangue impurities, because the sodium carbonate combines with the gangue impurities to form silicates and other reaction products. Also, the formation of finely divided and even colloidal silicates or the like, makes it difficult and even impossible, to extract the sodium tungstate. The same objections apply to the wet extraction of a tungsten ore by an aqueous solution of an alkaline extracting agent.

According to my invention, the extracting action of the extracting agent is so accelerated or improved by the catalyst, that it is possible to extract at low temperature, low pressure, and during a much shorter period of extraction, so that I can treat a tungsten ore which has 85% or more of gangue impurities, with minimum reaction between the extracting agent and the gangue impurities. I can thus treat very low-grade ores, without the preliminary expense of refining these ores by removing a part or all of their 85% or more of gangue impurities. Also, the solid residue of the reaction mass of the wet catalytic extraction step is in the form of coarse particles, largely free from colloidal particles, so that the liquid fraction of the reaction mass can be easily separated from said solid residue by an ordinary vacuum filter. This solid residue contains the water-insoluble or precipitated compounds of iron, manganese, lead, copper and other non-selected or separated metals. As above noted, manganese, lead and copper resemble iron in that they can form manganates, plumbates and cuprates, from which respective compounds are precipitated by aqueous solutions of compounds of the alkali metals. Also, manganese, lead and copper form formates which are very soluble or substantially soluble in water, which is another reason for preferring a formate catalyst.

The invention is sufficiently explained by reference to the extraction of tungsten ores. The following discloses the general principle and operation of the entire invention, without being limited to its details.

The principal tungsten ores from which tungsten is extracted in the form of a water-soluble tungstate, are wolfram, ferberite and hübnerite. These ores have tungsten and other metals in the form of their oxides.

The content of the metallic oxides in the crude tungsten ore depends on the source of the ore. These three principal crude tungsten ores have large percentages of gangue impurities, which consist largely of silica, and also include lime and alumina.

Excluding its gangue impurities, the average composition of wolfram is as follows:

|  | Colorado | Burma | Siam |
| --- | --- | --- | --- |
| $WO_3$ | 74.10 | 75.41 | 75.00 |
| Fe | 11.07 | 17.33 | 15.05 |
| MnO | 14.35 | 7.13 | 8.26 |

Excluding its gangue impurities, the average composition of ferberite is as follows:

|  | Cornwall | Spokane | Colorado |
| --- | --- | --- | --- |
| $WO_3$ | 73.16 | 75.0 | 75.9 |
| FeO | 22.78 | 18.0 | 23.0 |
| MnO | 3.06 | 3.0 | 0.6 |

Excluding its gangue impurities, the average composition of hübnerite is as follows:

|  | Colorado | Washington |
| --- | --- | --- |
| $WO_3$ | 75.68 | 76.5 |
| FeO | 0.24 | 4.4 |
| MnO | 23.40 | 18.5 |

The following examples, which are the results of tests, illustrate the invention.

All proportions stated in the examples and elsewhere in this disclosure are by weight.

*Example No. 1*

In this test or example, the ore or starting material was a low grade Colorado ferberite, $FeO.WO_3$, which had about 96% of gangue impurities and only about 4% of $FeO.WO_3$. This ore had about 3.2% of $WO_3$. This crude ore was treated while it was crude and had all its gangue impurities, which consisted largely of silica.

This ore was treated in finely divided form, in which its particles could pass through a No. 100 sieve, whose sieve opening was 0.149 millimeter or 0.0059 inch.

Such a crude and low grade ore cannot be commercially treated by any prior method.

Twenty-five parts of said crude ore were treated.

As above noted, all proportions stated herein are by weight, so that the twenty-five parts may be 25 kilograms or any other unit of weight.

An extracting or reacting solution was made of twenty-five parts of water, five parts of dissolved sodium hydroxide as the extracting agent, and 0.5 part of dissolved sodium formate catalyst. The solutes of this solution are calculated on the weight of the water. This solution is defined as having twenty percent of dissolved sodium hydroxide and two percent of dissolved sodium formate. In this example, the weight of the aqueous extracting solution was approximately equal to the weight of the crude ore. The weight of the aqueous extracting solution may be substantially greater than the weight of the crude ore, such as twice the weight of the crude ore. Preferably and optionally, the concentration of the dissolved sodium hydroxide is at least 18%. If another extracting agent is used, its extracting activity is preferably and optionally equal to that of said 18% aqueous solution of sodium hydroxide. That is, sodium hydroxide is taken as a convenient standard of extracting activity. It may be replaced by potassium hydroxide or other alkaline or basic extracting agent, depending on the ore or starting material.

The crude ore was thoroughly mixed with the extracting solution of the extracting agent and the catalyst. The mixture was kept at 108° C., with constant stirring during the extraction or reaction period, in a suitable tank. In this example, the required extraction or reaction period at 108° C. was only thirty-five minutes, which is very short and highly desirable. The pressure of the extraction or reaction step was close to normal atmospheric pressure of 760 millimeters of mercury. The extraction or reaction may be done in an open tank or in a closed tank. A short extraction or reaction period at low temperature and low pressure is desirable, because it is economical and it minimizes the formation of water-soluble or water-dispersible silicates or other reaction products of the gangue impurities with the alkali, in finely divided or colloidal form. The test of the coarseness of the residue is easy filtration by a commercial vacuum filter.

At the end of this extraction or reaction period of thirty-five minutes, substantially all the tungsten had been converted to water-soluble sodium tungstate, which was dissolved in the aqueous extracting solution.

Substantially all the other ingredients of the original crude ore were in the reaction mixture or mass in water-insoluble form, save for the formation of some sodium silicate. The dissolved sodium hydroxide reacted with the ferrous oxide of the ferberite to produce a precipitated iron hydroxide, which was in the solid part or residue.

This solid part or residue of the reaction mass was in coarse particle form, largely or substantially free from fine or colloidal particles, so that the water and its solutes, including the tungsten salt, were quickly and readily separated from said residue by filtration at about 60° C., using an ordinary commercial vacuum filter. This is one of the substantial advantages of the invention, because it eliminates the use of special and expensive filters, and it also eliminates slow and difficult filtration. Hence the invention makes it possible to use a suitable high concentration or activity of the sodium hydroxide or potassium hydroxide or other extracting or reacting agent in the extracting or reacting solution, because the moderate pressure and moderate temperature and short extracting period minimize the formation of a solid residue which has fine particles which make filtration slow and difficult.

The residue may be thoroughly washed with water after filtration, in order to wash out any residual water-soluble sodium tungstate.

Tests have shown that substantially all the tungsten trioxide was converted into the corresponding water-soluble tungstate, substantially all of which was extracted in this example in the filtrate and wash water.

To test the extraction, the residual solids were dissolved in a dilute aqueous solution of hydrochloric acid. This solution was tested by the spectroscope and by adding zinc powder. These tests showed only faint traces of tungsten in the residue.

The sodium formate was not decomposed in this reaction. It evidently acted solely as a catalyst or accelerating agent.

Example No. 2

This example was performed in order to show the advantage of using the anion (COONa—).

In Example No. 2, all the factors were identical with Example No. 1, save that the sodium formate was omitted from the solution, and the extraction period was initially five hours and was then increased to eight hours, instead of only thirty-five minutes as in Example No. 1, due to the much slower extracting action in the absence of the catalyst.

At the end of the initial extraction period of five hours in this Example No. 2, the color of the mixture showed that a considerable part of the ore was unreacted.

The heating and stirring were therefore continued during an additional period of three hours.

At the end of the total extraction period of eight hours in this Example No. 2, there was a much greater formation of sodium silicate in colloidal form. Under the same conditions of pressure and temperature, the catalyst produced better results during an extraction period of only thirty-five minutes.

The filtration and washing in Example No. 2 were the same as in Example No. 1, and the residue of Example No. 2 was tested as in Example No. 1. The test showed that the percentage of $WO_3$ in the residue of Example No. 2 was more than ten percent of the original $WO_3$ in the ore.

Preferably, the weight of the dissolved sodium hydroxide or potassium hydroxide, which exemplify the extracting agents, is from 18% to 25% of the weight of the water of the extracting solution, and the weight of the sodium formate catalyst or potassium formate catalyst is from two percent to three percent of the weight of said water. If other extracting agents are used, they preferably have the activity of an 18% to 25% aqueous solution of sodium hydroxide. If other catalysts are used, they may have the activity of a 1% to 10% aqueous solution of sodium formate.

The weight of the anion (COONa—) in sodium formate is substantially equal to the entire weight of the sodium formate.

Hence the weight of the anion group of another carboxylic catalyst may be at least one percent of the weight of the water of the extracting solution, and this ratio may be up to ten per cent or more.

When ferberite is thus processed, the color of the residue changes when exposed to air, thus indicating an oxidation of the precipitated iron compound in said residue. The aqueous solution of the sodium tungstate is substantially free from the salts or compounds of the non-selected metals, which are iron and manganese in this example.

The well-known reaction between the water-insoluble tungsten trioxide and sodium hydroxide is, $$WO_3 + 2NaOH = Na_2WO_4 + H_2O$$

The catalyst also accelerates this reaction, irrespective of other reactions. Hence the invention includes the reaction between oxides or other compounds of the selected metals and the aqueous solution of the alkaline reacting agent. These oxides or compounds may be individually treated or in a complex.

The percentage of the (COOX—) catalyst, the temperature and pressure and time of reaction, necessarily vary in accordance with the starting material, but such variations can be easily determined by routine tests.

I have described preferred embodiments of my invention, but numerous changes, omissions, additions and substitutions can be made, without departing from its scope. The invention is further described and defined in the appended claims. For the purposes of the claims, an alkaline extracting agent or reacting agent is defined as an agent whose aqueous solution has a pH value above seven, and an alkaline extracting solution is defined as a solution whose pH value is about seven. Hence the invention is not limited to the use of hydroxides of the metals of the alkali group, although these are the highly preferred extracting or reacting agents. Whenever any claim refers to a substituent metal atom, this includes a basic radical unless otherwise stated in the claims, if the anion group which has the substituted basic radical instead of a substituted metal atom, is stable under the conditions of the process.

I claim:

1. A method of treating a tungsten ore, which consists in contacting and reacting said ore with an aqueous solution of the hydroxide of an alkali metal and of a catalyst which has a (COOX—) anion, the weight of said hydroxide being substantially 18% to 25% of the weight of the water of said solution, said (COOX—) anion being a substituted carboxylic group whose carboxylic hydrogen has been replaced only by a metal atom of a metal of the alkali group designated as "X," the weight of said catalyst being at least one percent of the weight of the water of said solution, and stirring and reacting said ore with said solution at substantially 100° C.–108° C. and at a pressure of substantially 760 millimeters of mercury, to form a tungsten salt which is dissolved and stable in said solution.

2. A method according to claim 1 in which the catalyst is sodium formate and the weight of the sodium formate is at least substantially 2% of the weight of said water.

3. A method according to claim 1 in which the catalyst is potassium formate and the weight of the potassium formate is at least substantially 2% of the weight of said water.

4. A method according to claim 1, in which the tungsten ore is intermixed with at least 85% of gangue impurities, and the reaction period is sufficiently short to provide a coarse solid residue which is substantially free from colloidal particles to permit easy separation of the solution by a vacuum filler.

5. A method according to claim 1, in which the ore is ferberite.

6. A method according to claim 1, in which the ore is ferberite, the catalyst is sodium formate, and the weight of the sodium formate is at least substantially 2% of the weight of said water.

7. A method according to claim 1, in which the ore is ferberite, the catalyst is potassium formate, and the weight of the potassium formate is at least substantially 2% of the weight of said water.

8. A method according to claim 1, in which the ore is ferberite, said ferberite is intermixed with at least 85% of gangue impurities, and the reaction period is sufficiently short to provide a solid residue which is substantially free from colloidal particles to permit easy separation of the solution by a vacuum filler.

No references cited.